(12) United States Patent
Sundralingam et al.

(10) Patent No.: US 9,593,889 B2
(45) Date of Patent: Mar. 14, 2017

(54) HEAT EXCHANGER CONSTRUCTION (71) Applicant: Dana Canada Corporation, Oakville (CA)

(72) Inventors: Sudesh Sundralingam, Milton (CA); Mark Kozdras, Oakville (CA)

(73) Assignee: Dana Canada Corporation, Oakville, Ontario (CA)

( * ) Notice: Subject to any disclaimer, the term of this patent is extended or adjusted under 35 U.S.C. 154(b) by 109 days.

(21) Appl. No.: 14/513,868

(22) Filed: Oct. 14, 2014

(65) Prior Publication Data

US 2015/0026982 A1 Jan. 29, 2015

Related U.S. Application Data (63) Continuation of application No. 12/593,745, filed as application No. PCT/CA2008/000633 on Apr. 4, 2008, now abandoned.

(60) Provisional application No. 60/910,354, filed on Apr. 5, 2007.

(51) Int. Cl.
*F28F 1/04* (2006.01)
*F28F 1/40* (2006.01)
*F28F 9/02* (2006.01)
*F28D 1/053* (2006.01)
*F28F 3/02* (2006.01)

(52) U.S. Cl.
CPC ............ *F28F 1/04* (2013.01); *F28D 1/05366* (2013.01); *F28F 1/40* (2013.01); *F28F 9/0224* (2013.01); *F28F 3/025* (2013.01); *F28F 2275/04* (2013.01); *Y10T 29/49389* (2015.01)

(58) Field of Classification Search
CPC .... F28F 1/04; F28F 1/40; F28F 9/0224; F28F 3/025; F28F 2275/04; F28D 1/05366; Y10T 29/49389
See application file for complete search history.

(56) References Cited

U.S. PATENT DOCUMENTS

| | | |
|---|---|---|
| 3,866,675 A | 2/1975 | Bardon et al. |
| 4,936,381 A | 6/1990 | Alley |
| 5,125,454 A | 6/1992 | Creamer et al. |
| 5,762,133 A | 6/1998 | Dion |
| 6,250,381 B1 | 6/2001 | Nishishita |
| 6,305,465 B1 | 10/2001 | Uchikawa et al. |
| 6,357,521 B1 | 3/2002 | Sugimoto et al. |
| 6,601,644 B2 | 8/2003 | Ozaki et al. |
| 6,736,203 B2 | 5/2004 | Rhodes et al. |
| 6,745,827 B2 | 6/2004 | Lee et al. |
| 6,904,958 B2 | 6/2005 | Ozaki et al. |

(Continued)

FOREIGN PATENT DOCUMENTS

JP H0571892 A 3/1993

OTHER PUBLICATIONS

International Search Report for Application No. PCT/CA2008/000633, mailing date Jul. 31, 2008.

*Primary Examiner* — Moshe Wilensky
(74) *Attorney, Agent, or Firm* — Marshall & Melhorn, LLC (57) ABSTRACT

A method for constructing a heat exchanger having a pair of headers and a plurality of tubes extending between and fluidly connecting the headers is described. For each header, a pair of body elements is provided each formed of brazing clad material. A tubular assembly is formed of brazing clad material for each tube. The tubular assembly, for each tube, is fitted into apertures. The body elements and the tubular assemblies are brazed together to form the heat exchanger.

7 Claims, 7 Drawing Sheets

(56) References Cited

U.S. PATENT DOCUMENTS

| | | |
|---|---|---|
| 7,032,656 B2 | 4/2006 | Lamich |
| 2006/0048930 A1 | 3/2006 | Ozaki et al. |
| 2006/0213651 A1 | 9/2006 | Higashiyama et al. |
| 2006/0243429 A1 | 11/2006 | Chu et al. |
| 2007/0051504 A1 | 3/2007 | Ohashi |

HEAT EXCHANGER CONSTRUCTION

RELATED APPLICATIONS

The present application is a continuation application which claims priority to and the benefit of pending patent application Ser. No. 12/593,745 filed on Sep. 29, 2009, which claims priority to and the benefit under 35 USC 371 of application serial number PCT/CA2008/000633 filed on Apr. 4, 2008, which claims priority to and the benefit of provisional patent application Ser. No. 60/910,354 filed on Apr. 5, 2007.

FIELD OF THE INVENTION

The present invention relates to the field of heat exchangers.

BACKGROUND OF THE INVENTION

Figure 1:
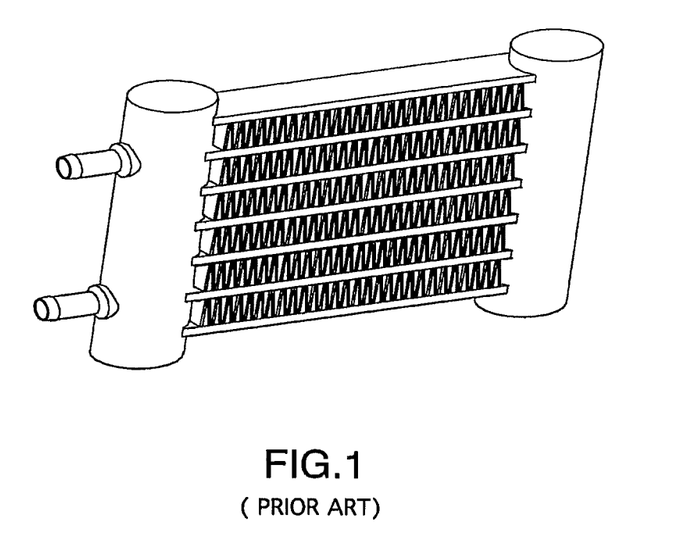
FIG. 1 is a perspective, partially conceptual view of a heat exchanger according to the prior art.
Figure 2:
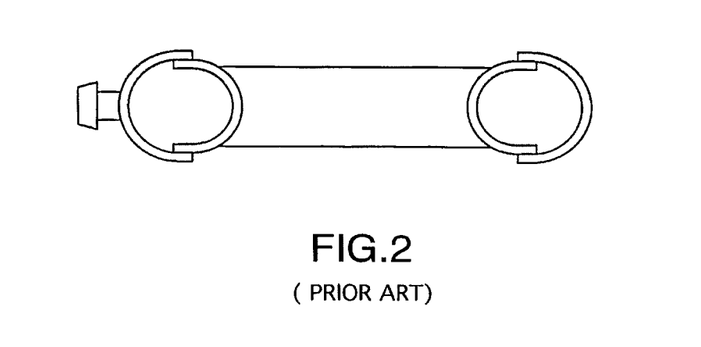
FIG. 2 is a top view of the structure of FIG. 1.

Heat exchangers are well known in the prior art and typically include a pair of headers between which extend a plurality of tubes, and a plurality of fins interleaved between the tubes. An exemplary heat exchanger of the prior art is illustrated, partially conceptually, in FIG. 1. Often, the tubes are extruded elements which are fitted into apertures formed in the headers and sealed thereto by flux brazing. The tubes can be multi-port aluminum extrusions, having a plurality of discrete fluid passages defined lengthwise of the tube. The tubes can also be seam-welded tubes or extruded tubes having a single longitudinal interior passage. In the latter case, to improve heat transfer characteristics it is known to push or draw through the tube an elongate turbulizer of expanded metal or the like. The headers are often formed of a tubular part in which the apertures are defined and which is defined by a pair of trough-shaped or channel elements, and a pair of caps which close the ends of the tubular part. Often, the trough-shaped elements and caps are brazed or welded together. The trough-shaped elements are often of differing dimensions, such that the longitudinal peripheral edges of one of the trough-shaped elements fit within the longitudinal peripheral edges of the other, as shown in FIG. 2. This facilitates fixturing during the brazing operation. The channel elements can be self-fixturing, i.e. snap-fittable within one another, or an external fixture can be utilized.

SUMMARY OF THE INVENTION

An improved heat exchanger, said heat exchanger being of the type including a pair of headers and a plurality of tubes extending between and fluidly connecting the headers, forms one aspect of the invention. The improvement comprises: a tubular structure for and defining in part each of said headers, the tubular structure being defined by a pair of body elements and having opposed longitudinal joints defined by overlapping portions of the body elements. One of the body elements overlaps the other of the body elements to define one of the joints and is overlapped by the other of the body elements to define the other of the joints.

According to another aspect of the invention, one of the body elements can have an aperture for each tube; and each tube can interface with the other of the body elements in a single butt joint.

According to another aspect of the invention, the body elements can be channels of arcuate profile with longitudinal edge portions that define the overlapping portions; and measured in the direction by which the longitudinal edge portions of the other of the body elements are spaced-apart from one another, an outer width of each tube can be substantially equal to the distance by which said longitudinal edge portions are spaced-apart.

An improved heat exchanger selected from the group including condensers and evaporators for automotive air conditioners and automotive oil coolers and radiators forms another aspect of the invention. The heat exchanger is of the type including a pair of headers and a plurality of tubes extending between and fluidly connecting the headers. The improvement comprises: a cover and a pan interfitted with and brazed to the cover to define each tube.

According to another aspect of the invention, a tubular structure can be provided for and define in part each of said pair of headers; and the tubes can be brazed to the headers.

According to another aspect of the invention, the tubular structure can be defined by a pair of body elements of arcuate profile brazed together.

According to another aspect of the invention, in each tube a turbulizer can be provided, the turbulizer including a pair of coplanar base flanges dimensioned to centre the turbulizer in the tube.

An improved turbulizer, of the type for use in a tube formed of cooperating portions brazed together, forms another aspect of the invention. The improvement comprises: a pair of coplanar flanges dimensioned to centre the turbulizer in the tube in use.

A method for constructing a heat exchanger forms another aspect of the invention. The heat exchanger is of the type including a pair of headers and a plurality of tubes extending between and fluidly connecting the headers. The method comprises the steps of: for each header, providing a pair of body elements each formed of brazing clad material; and brazing the body elements together such that the headers each have opposed longitudinal joints defined by overlapping portions of the body elements, one of the body elements overlapping the other of the body elements to define one of the joints and being overlapped by the other of the body elements to define the other of the joints.

According to another aspect of the invention: for each tube, a tubular assembly formed of brazing clad material can be provided; one of the body elements can have an aperture formed therein for each tube and the tubular assembly for each tube can be fitted into the apertures formed for said each tube; and the body elements and the tubular assemblies can be brazed together to form said heat exchanger.

According to another aspect of the invention, each tubular assembly can interface with the other of the body elements in a single butt joint.

According to another aspect of the invention, the body elements can be channels of arcuate profile with longitudinal edge portions that define the overlapping portions; and in the heat exchanger, measured in the direction by which the longitudinal edge portions of the other of the body elements are spaced-apart from one another, an outer width of each tube can be substantially equal to the distance by which said longitudinal edge portions are spaced-apart.

A method of constructing a heat exchanger, selected from the group including condensers and evaporators for automotive air conditioners and automotive oil coolers and radiators, is disclosed. The heat exchanger is of the type including a pair of headers and a plurality of tubes extending between and fluidly connecting the headers. The method comprises the steps of: for each header, providing a tubular structure formed of brazing clad material, the tubular structure having an aperture formed therein for each tube; for each tube, providing a cover and a pan, both formed of brazing clad material and fitting the pan into the cover to form a tubular assembly; fitting the tubular assembly for each tube into the apertures formed for said each tube; and brazing the tubular structures, the covers and the pans together.

According to another aspect of the invention, for each tubular structure can be provided a pair of body elements each formed of brazing clad material, one of the body elements defining the apertures for said each tubular structure; and the body elements can be fitted together to form said tubular structure, and brazed to one another when the tubular structures, the covers and the pans are brazed together.

According to another aspect of the invention, for each tube a turbulizer can be provided and fitted into the cover provided for said each tube to form a tube subassembly, into which tube subassembly the pan provided for said each tube is fitted to form the tubular assembly.

According to another aspect of the invention, each turbulizer can be provided with a pair of coplanar flanges dimensioned to centre said each turbulizer in the tube for which it is provided.

According to another aspect of the invention: each of the pan and cover can include a body plate and a pair of peripheral flanges extending from the body plate; and prior to assembly of the pan and cover, the turbulizer can be inserted into the cover, with the flanges seated against the cover body plate.

An improved heat exchanger forms another aspect of the invention. The heat exchanger is of the type including a pair of headers and a plurality of tubes extending between and fluidly connecting the headers. The improvement comprises: a cover and a pan interfitted with and brazed to the cover to define each tube. In each tube a turbulizer is provided, the turbulizer including a pair of coplanar base flanges dimensioned to centre the turbulizer in the tube.

According to yet another aspect of the invention, a tubular structure can be provided for and define in part each of said pair of headers, the tubular structure being defined by a pair of body elements brazed together.

The invention permits the construction of heat exchangers of relatively high performance and durability at relatively low cost. Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter being briefly described hereinafter.

DETAILED DESCRIPTION

Figure 3:
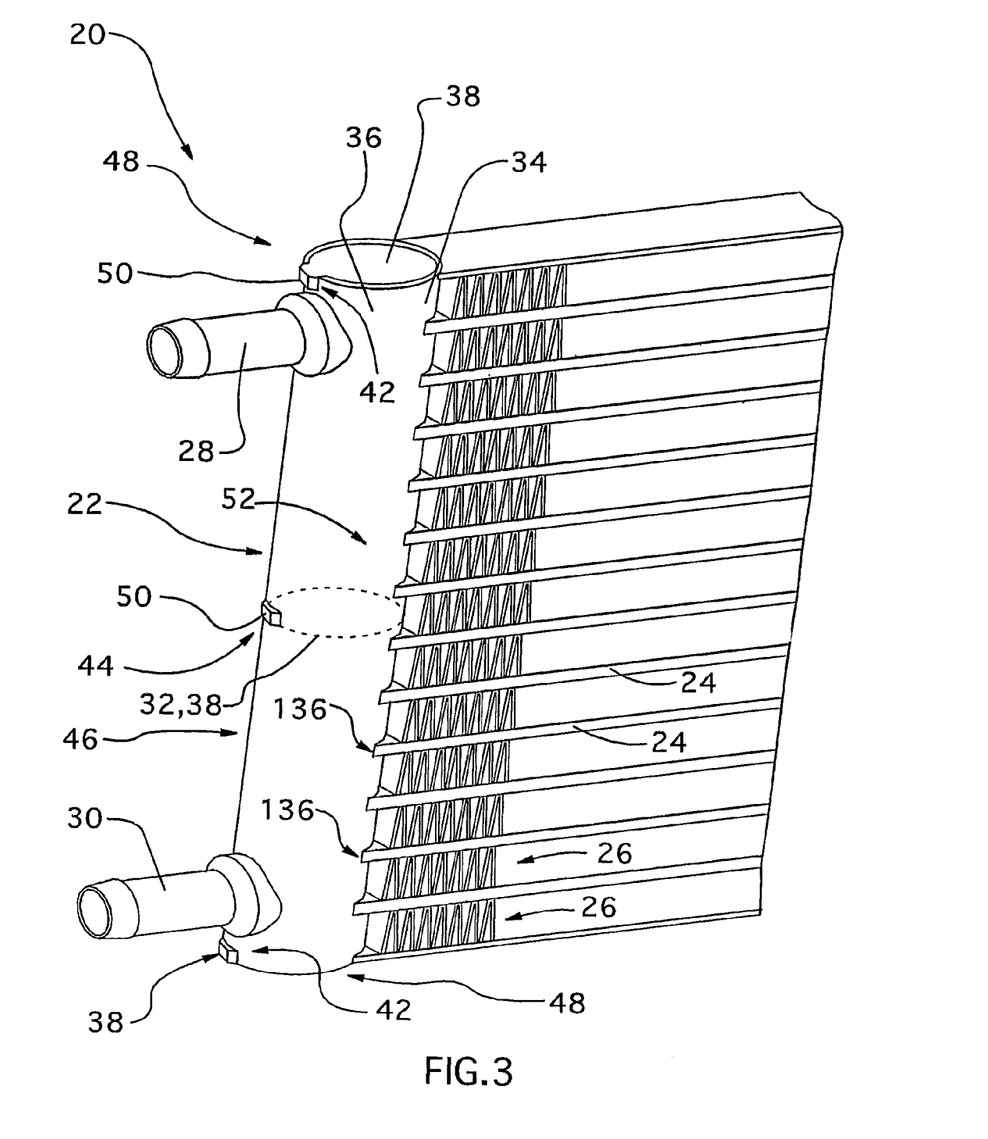
FIG. 3 is a partial perspective view of a heat exchanger according to an exemplary embodiment of the invention.
Figure 4:
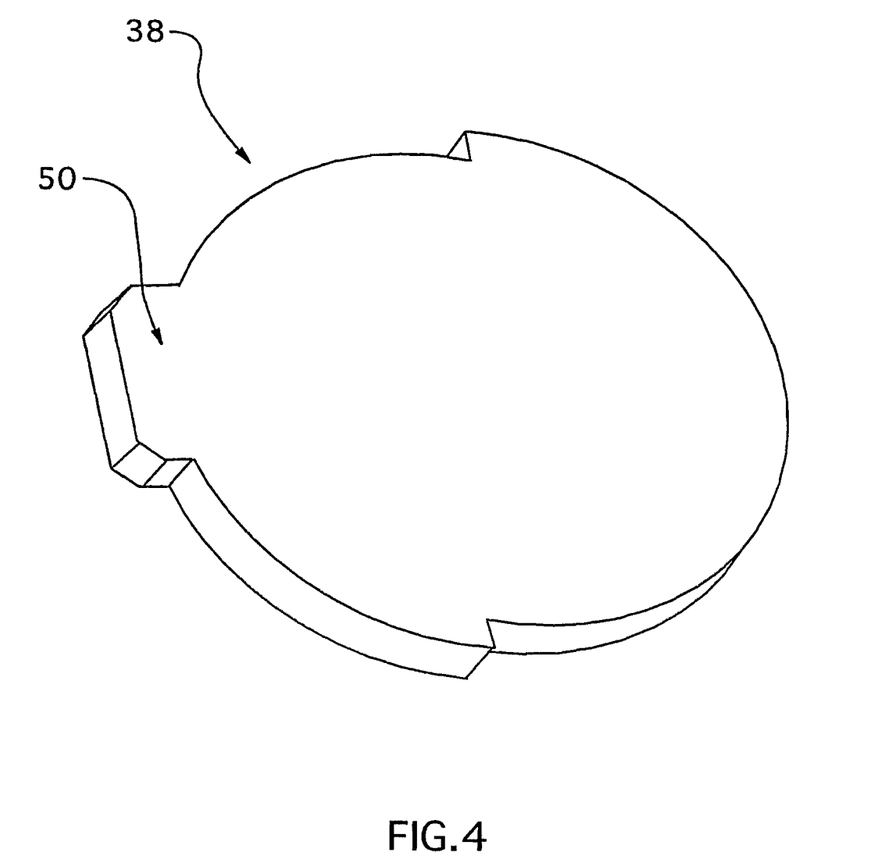
FIG. 4 is a perspective view of a cap portion of the structure of FIG. 3.

An improved heat exchanger 20 forms one aspect of the invention and is illustrated in partial perspective in FIG. 3. For greater certainty, it should be understood that the illustrated heat exchanger 20 is an exemplary embodiment, only, and is not to be construed as limiting in any way to the scope of the invention.

Exchanger 20 will be seen to be of the general type including a pair of headers 22 (only one shown); a plurality of tubes 24 extending between and fluidly connecting the headers 22; and a plurality of fins 26 interleaved between the tubes 24. The exchanger 20 shown will further be seen to be of the two pass type, with inlet 28 and outlet 30 spigots disposed at opposite ends of the same manifold or header 22, which header 22 is segmented by an intermediate plate (shown in phantom and designated with reference numeral 32) to avoid direct flow between the inlet 28 and outlet 30.

The improvement resides in various features of construction of the headers 22 and tubes 24, and the interconnection therebetween, all as described hereinafter in detail.

Figure 5:
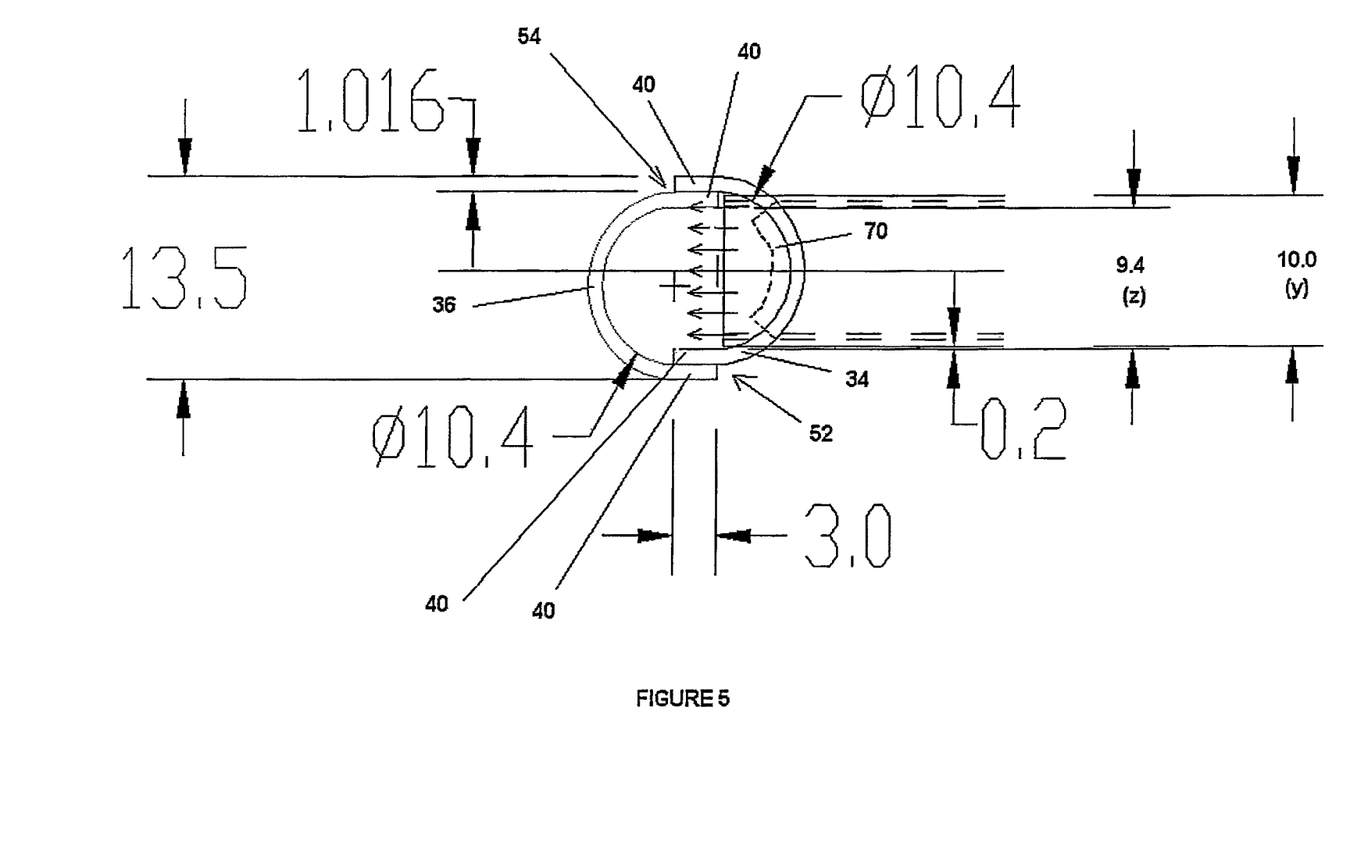
FIG. 5 is a cross-sectional view of a portion of the structure of FIG. 3.

With reference to FIGS. 3 and 5, the headers 22 each comprise a pair of body elements 34,36 and a pair of caps 38. The body elements 34,36 are roll-formed or stamped channels or troughs of arcuate profile with longitudinal edge portions 40 and are formed out of braze clad aluminum of 1.0 mm thickness. One of the elements 34 has a plurality of apertures 136 punched or otherwise formed therein for receiving the tubes 24, as discussed fully hereinafter. The other of the elements 36 has the spigots 28,30 extending therefrom, and is provided with notches 42 at its ends and an intermediate slot 44. The caps 38 are planar elements formed out of 3.0 mm unclad aluminum sheet material. When assembled, the pair of body elements 34,36 define a tubular structure 46, the ends 48 of which are occluded by respective caps 38. Tabs 50 on the caps 38 register with the notches 42. A further "cap" has its tab 50 in register within the intermediate slot 44 and defines the intermediate plate 32 in this condenser 20. To form header 22, the body elements 34,36 and caps 38 are assembled together and exposed to brazing conditions in a brazing furnace (not shown). The caps 38 "master" the joint, such that dimensional issues are controlled by the cap, which is advantageous from the standpoint of manufacturability.

The completed header 22 illustrated is characterized in the presence of opposed longitudinal joints 52,54 defined by overlapping portions 40 of the body elements 34,36. More specifically, one of the body elements 34,36 overlaps the other of the body elements 34,36 to define one of the joints 52 and is overlapped by the other of the body elements to define the other 54 of the joints, as shown in FIG. 5. In the illustrated embodiment, the portions 40 overlap one another over a distance of about 3.0 mm, to provide for a good seal in the joints 52,54. This "overlap and underlap" arrangement of the body elements 34,36 is advantageous as compared to the conventional "overlap and overlap" arrangement (i.e of FIG. 2) in that, by so modifying the geometry, with a substantially similar amount of material, a tube having a greater cross-sectional area is obtained.

Figure 5A:
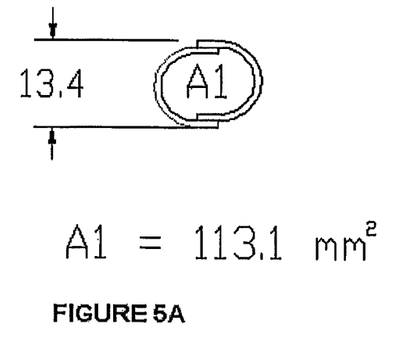
FIG. 5A is a simplified view of a portion of FIG. 5.
Figure 6:
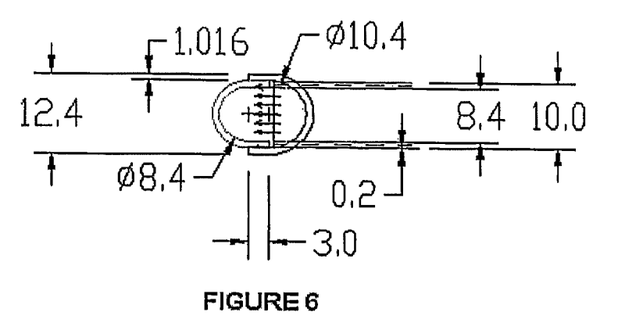
FIG. 6 is a view similar to FIG. 5 of the structure of FIG. 1.
Figure 6A:
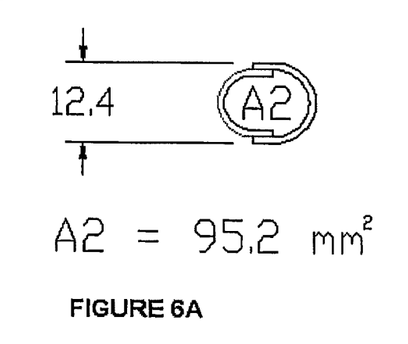
FIG. 6A is a simplified view of a portion of FIG. 6.

This is evident from a comparison of the structure of FIG. 5, which shows a cross section of the header of FIG. 3 and a portion of a tube, and the structure of FIG. 6, which shows the analogous structure of a heat exchanger of similar size constructed according to the conventional overlap and overlap arrangement, which has a cross-sectional area only 84% as large as that of FIG. 5, as indicated by FIGS. 5A,6A. The greater area of the FIG. 5 structure, of course, advantageously reduces pressure drop.

Figure 11:
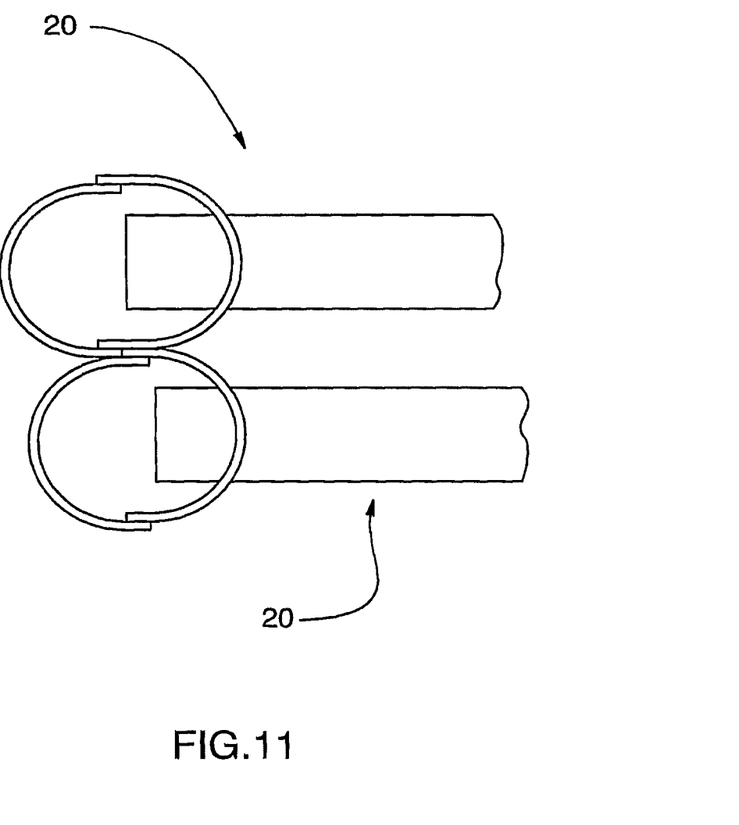
FIG. 11 is a view, similar to FIG. 2, of a pair of heat exchangers according to a further exemplary embodiment of the invention disposed in stacked relation.

A yet further advantage of the "overlap and underlap" arrangement is associated with the elegant and efficient manner in which multiple heat exchangers 20 can be stacked together, as shown in FIG. 11, with only three material thicknesses separating the manifold interiors, in contrast to the four material thicknesses associated with the conventional "overlap and overlap". This has advantages in terms of the overall width of a stacked heat exchanger, which can be advantageous in automotive applications, as the space available in the engine compartment or air box of a vehicle is limited.

Figure 7:
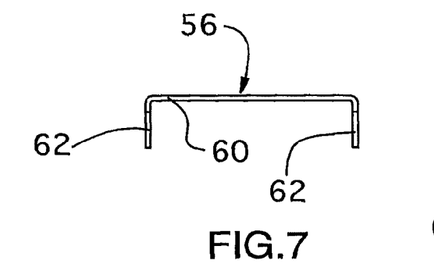
FIG. 7 is a cross-sectional view of a portion of a tube of the structure of FIG. 3.
Figure 8:
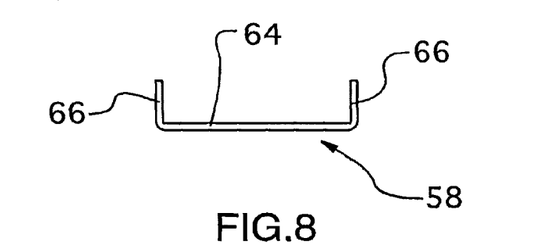
FIG. 8 is a cross-sectional view of another portion of a tube of the structure of FIG. 3.

With regard to the tubes 24, the tubes 24 of the disclosed embodiment are defined by a cover 56 and a pan 58, as shown in FIGS. 7 and 8, respectively. The cover 56 is formed of braze clad aluminum of 0.4 mm thickness and includes a body plate 60 and a pair of peripheral flanges 62 extending from the body plate 60. The pan 58 is also formed of braze clad aluminum of 0.4 mm thickness and includes a body plate 64 and pair of peripheral flanges 66.

The pan 58 is dimensioned to fit within the cover 56. The assembled, but not brazed, pan 58 and cover 56 together define a tubular assembly. Once exposed to brazing conditions, the pan 58 and the cover 56 braze to one another to define a tube 24.

This tube construction is advantageous, in that it permits a fluxless braze joint to be created between the tubes 24 and the headers 22, even in association with manifolds constructed out of relatively thin gauge material, such as 0.020"-0.070" inch material, as the brazing material on the tubes accommodates the relatively lesser amounts of brazing material provided on the headers in thin-wall construction.

In assembly of the condenser 20, the tubular assembly for each tube 24 is fitted into the apertures 136 formed for said each tube 24 in the body elements 34, as shown in FIG. 5, and the entire assembly is subjected to brazing conditions in a brazing furnace, to braze the pans 58 to the covers 56, the body elements 34,36 to one another, the caps 38 to the body elements 34,36 and the tubes 24 to the headers 22. Flared material 70, resultant from the punching operation by which the apertures 136 in the body elements 34 were formed, can be maintained, to provide a relatively large lap joint for tube 24-header 22 braze joint. This can also facilitate tube entry.

Recalling that one 34 of the body elements has an aperture 136 for each tube 24, the illustrated tube-header joint is characterized in that each tubular assembly interfaces with the other 36 of the body elements in a single butt joint, and is further characterized in that, measured in the direction by which the longitudinal edge 40 portions of the other 36 of the body elements are spaced-apart from one another, an outer width y of each tube 24 is substantially equal to the distance by which said longitudinal edge portions 40 are spaced-apart. Importantly, all things remaining equal, this manner of tube-header joiner provides for a greater inlet size than that obtained via the conventional "overlap and overlap" arrangement, as evidenced by FIGS. 5,6, wherein, from a common 10 mm tube size, inlet diameter z is shown to increase from 8.4 mm to 9.4 mm, that is, the thickness of the material forming the body elements, through the use of the "under and overlap" configuration.

Figure 9:
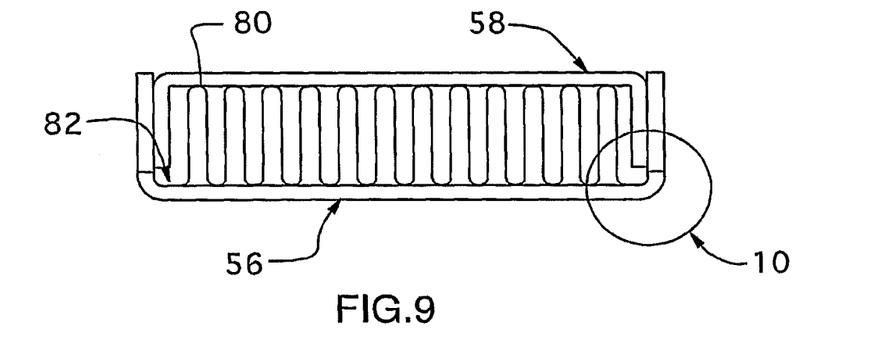
FIG. 9 is a cross-sectional view of a tube of the structure of FIG. 3.
Figure 10:
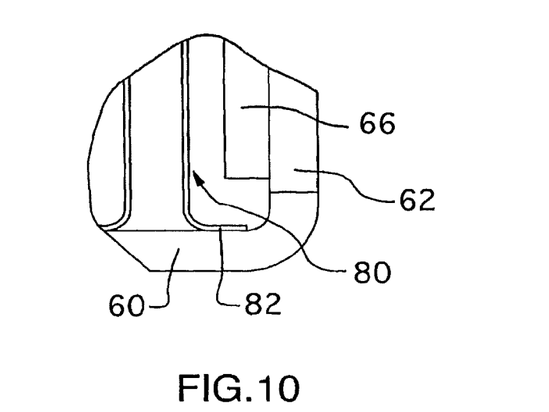
FIG. 10 is an enlarged view of encircled area 10 of FIG. 9.

A further advantage of the pan 58 and cover 56 tube construction over extruded tubes is that it permits the ready introduction of a turbulizer 80 into the tube, as shown in FIG. 9. To do so, the turbulizer 80 merely needs to be fitted into one of the pan 58 and the cover 56 before assembly of the pan and cover.

The turbulizer 80 illustrated in FIG. 9 is notable in the presence of a pair of coplanar flanges 82 which extend outwardly from the base of the turbulizer 80. With the exception of the flanges 82, the turbulizer 80 can be of any conventional construction and, for example, can be of the expanded metal or offset fin variety.

In assembly of the illustrated heat exchanger, prior to assembly of the pan 58 and the cover 56, the illustrated turbulizer 80 is inserted into the cover 56, with the coplanar flanges 82 seated against the cover body plate 60 to form a tube subassembly (not shown). Once the turbulizer 80 is so inserted, the pan 58 is fitted into the cover 56. Coplanar flanges 82 are dimensioned to centre or locate the turbulizer 80 in the passage defined by the assembled pan and cover 56,58, i.e. to space the outermost corrugations of the turbulizer 80 from the inner tube wall surfaces a distance equivalent to the spacing between the corrugations, so as to avoid undesirable bypass flow and dead zones and maximize heat transfer. Advantageously, the height of the turbulizer, i.e. the amplitude of the corrugations in the case of an offset fin turbulizer, is such that the pan 58 and cover 56 are both brazed thereto during the brazing of the tubes. The pan 58 may bear against the coplanar flanges 82 in the assembled tube, but relatively shorter flanges 66 on pan 58 will maximize the likelihood of good braze joints between the turbulizer 80, pan 58 and cover 56, with a commensurate effect on the resultant burst strength of tube 24.

A yet further advantage of the pan and cover tube construction is that it permits fins 26 to be readily constructed out of unclad aluminum sheet, with the cladding on the pans and the covers providing brazing material for the joinder of the fins 26 to the tubes 24 during the brazing of the various components to one another.

While but two embodiments of the present invention have been herein shown and described, it will be understood that various changes in size and shape of parts may be made.

For example, whereas in the illustrations, manifolds and tubes are constructed out of sheet material of a common thickness, the manifolds and tubes can be constructed out of materials of varying thicknesses. Tubes of varying widths can be utilized, and in the automotive field will typically range between 10 mm (as illustrated) and 50 mm. Manifolds of different cross-sections can also be utilized, as is clearly evident from FIG. 11, wherein two manifolds of differing size are shown, and it should be understood that the shape and size of the particular body elements employed impact on the cross-sectional area advantage associated with the shift from overlap/overlap to overlap/underlap configuration.

Additionally, whereas the illustrated heat exchanger is of the two-pass type, it will be readily appreciated that single or multiple-pass exchangers could similarly be constructed.

As well, whereas the illustrated turbulizer is shown in use in a pan and cover tube, it would also have usefulness elsewhere, such as in tubes formed of mating plate pairs, or in stacked dish structures.

Similarly, whereas only a single tab is shown on each cap, multiple tabs could be utilized, if desired.

Moreover, although fins are shown in FIG. 3, they could be omitted.

As well, whereas in the heat exchanger of FIG. 9, the tube is shown interfacing with the other body element (i.e. the body element that is not the body element in which the apertures are provided) in a single butt joint, as is evident from FIG. 11, heat exchangers according to aspects of the invention can be manufactured with each tube interfacing only with the body element through which the apertures are provided.

Further, it should be understood that manifolds for any heat exchanger or indeed any fluid core structure could be produced with the overlap and underlap structure shown. As well, turbulizers as described herein could be provided in any flat tube. Further, the illustrated tube to header joint is contemplated to have broad applicability in the context of heat exchangers and similar core structures using clad tubes other than pan and cover tubes, such as seam-welded clad tubes. Further, the pan and cover tube construction is contemplated to have applicability in the context of heat exchangers of various types including radiators, oil coolers and condensers and evaporators for air conditioners.

Finally, but without limitation, it should be appreciated that the maintenance of the flared material at the header apertures is not necessary, and might advantageously be removed in certain applications.

Accordingly, the invention should be understood as being limited only by the claims appended hereto, purposively construed.

The invention claimed is:

1. A method for constructing a heat exchanger, the heat exchanger being of the type including a pair of headers and a plurality of tubes extending between and fluidly connecting the headers, the method comprising the steps of:

for each header, providing a pair of body elements each formed of brazing clad material, one of the body elements having formed therein, for each tube, an aperture; and providing, for each tube, a tubular assembly formed of brazing clad material;

for each tube, fitting the tubular assembly provided therefor in to the apertures provided therefor;

brazing the body elements and tubular assemblies together to form the heat exchanger and such that the headers each have opposed longitudinal joints defined by overlapping portions of the body elements, one of the body elements overlapping the other of the body elements to define one of the joints and being overlapped by the other of the body elements to define the other of the joints, each of the headers having a substantially constant wall thickness but for the overlapping portions, the wall thickness in each overlapping being substantially defined by the combined thicknesses of the body elements, the joints in the tube being spaced apart from one another in a direction that is substantially normal to a plane that is parallel to the overlapping portions defining those joints, wherein each tubular assembly interfaces with the other of the body elements in a single butt joint.

2. A method according to claim 1, wherein the body elements are channels of arcuate profile with longitudinal edge portions that define the overlapping portions; and measured in the direction by which the longitudinal edge portions of the other of the body elements are spaced-apart from one another, an outer width of each tube is substantially equal to the distance by which said longitudinal edge portions are spaced-apart.

3. A method according to claim 1, wherein the body elements are channels of arcuate profile with longitudinal edge portions that define the overlapping portions; and in the heat exchanger, measured in the direction by which the longitudinal edge portions of the other of the body elements are spaced-apart from one another, an outer width of each tube is substantially equal to the distance by which said longitudinal edge portions are spaced-apart.

4. A method according to claim 1, wherein the tubular assembly is defined by a cover and a pan, both formed of brazing clad material, the pan being fitted into the cover to form the tubular assembly and wherein the body elements, the covers and the pans are brazed together.

5. A method according to claim 4, wherein: for each header, a pair of caps is provided, each cap having a tab; each header is defined in part by a tubular structure defined by the body elements, the tubular structure having, for each tab, a notch; in the heat exchanger, the caps occlude the ends of the tubular structure, each tab being received by the notch provided therefor; wherein the body elements, the covers, the pans and the caps are brazed together to form the heat exchanger.

6. A method according to claim 5, wherein the caps are used to master the header joints.

7. A method according to claim 1, wherein flared material, resultant from a punching operation by which the apertures were provided in the body elements, defines part of a lap joint for the tube to header braze joint.

* * * * *